Patented Dec. 16, 1952

2,622,111

UNITED STATES PATENT OFFICE 2,622,111

CATALYTIC HYDROGENATION OF UNSATURATED COMPOUNDS

Vladimir Haensel, Hinsdale, Ill., assignor to Universal Oil Products Company, Chicago, Ill., a corporation of Delaware No Drawing. Original application November 29, 1946, Serial No. 713,117. Divided and this application December 18, 1948, Serial No. 66,147

6 Claims. (Cl. 260—667)

This application is a division of my co-pending applicaton Serial No. 713,117, filed November 29, 1946, now Patent No. 2,456,633, December 21, 1948.

This invention relates to the hydrogenation of unsaturated compounds and more particularly to the use of a novel catalyst in hydrogenation reaction.

In a broad aspect the present invention relates to a hydrogenation process which comprises subjecting an unsaturated compound to contact at hydrogenating conditions with a catalyst prepared by treating a carrier material with a solution of a normally solid aromatic hydrocarbon, and subsequently compositing therewith a metal selected from group 8 of the periodic table comprising iron, cobalt, nickel and particularly platinum or palladium.

In accordance with the present invention a suitable supporting material, either naturally occurring or synthetically prepared and either inert or having catalytic activty, is treated with a solution of a normally solid aromatic hydrocarbon and subsequently is composited with the desired metal and particularly platinum or palladium. Inert carriers include silica, alumina, zinc oxide, etc., while carriers having catalytic activity include naturally occurring or synthetically prepared composites of silica-alumina, silica-magnesia, silica-zirconia, silica-alumina-zirconia, silica-alumina-magnesia, silica-alumina-thoria, etc. The carrier material may be prepared in any suitable manner, a particularly satisfactory method of preparing silica being to add a suitable acid, such as sulfuric acid, hydrochloric acid, etc., to commercial water glass in proportions to form silica. If spherically shaped catalysts are desired, the mixture of water glass and acid, at a controlled pH, may be distributed from a nozzle or rotating disc into a bath of oil under conditions that the silica gel sets to a firm sphere during passage through the oil bath. If the silica gel contains alkali ions, as in the case of silica formed from water glass, the silica is treated in any suitable manner, such as with acidulated water, to remove alkali ions. The carrier may be used in forms other than spheres, such as ground material or pellets formed by extrusion or pilling methods.

If the silica is to be composited with other metal oxide or oxides, this may be readily accomplished by commingling the silica with a salt of the other metal, such as aluminum chloride, magnesium sulfate, etc., and the oxide precipitated by the addition of a basic precipitant such as ammonium hydroxide, ammonium carbonate, etc. In other methods of compositing the silica with one or more metal oxides, the nitrate salts of the other metals may be commingled with the silica and the oxides formed by controlled heating to decompose the nitrates. It is understood that any suitable method of forming the carrier material may be applied within the scope of the present invention.

When desired, the carrier material may be dried at a temperature within the range of about 200° to about 500° F. for a period of 2 to 20 hours or more and/or calcined at a temperature of from about 500° to about 1200° F. or more for a period of 2 to 12 hours or more prior to the treatment thereof with the normally solid aromatic hydrocarbon. Any suitable normally solid aromatic hydrocarbon may be employed including biphenyl, triphenyl, anthracene, naphthalene, etc., and it may be dissolved in any suitable solvent including hydrocarbons, both aliphatic and aromatic, such as hexane, heptane, naphtha, benzene, etc., ethers, alcohols, ketones, etc. The amount of normally solid aromatic hydrocarbon will normally be within the range of about 5% to about 75% of the carrier material. The only requirement of the solvent is that it sufficiently dissolves the normally solid aromatic hydrocarbon and thereby serves to evenly distribute the normally solid aromatic hydrocarbon throughout the support. During the subsequent steps of the catalyst preparation, the solvent is removed from the catalyst.

After the carrier has been treated with the normally solid aromatic hydrocarbon solution, and excess solution removed, the carrier may be composited with platinum or palladium in any suitable manner. A particularly satisfactory method of compositing is to treat the carrier with a solution of chloroplatinic or choloropalladium acid and subsequently reducing the chloride at a temperature of from about 150° to about 250° F., followed by heating to a temperature of from about 400° to about 800° F. In general, the platinum or palladium will constitute a minor proportion of the final catalyst and, in general, will be within the range of about 10% to about 45% by weight thereof, although in some cases higher concentrations may be employed.

Catalysts prepared in the above manner have been found to be of unexpectedly higher activity than platinum catalysts prepared in the absence of the normally solid aromatic hydrocarbon.

Catalysts prepared in the above manner may be used to hydrogenate olefins, aromatics, aldehydes, ketones, unsaturated acids, nitrogen-containing compounds, etc. In addition the catalyst can be used for the conversion of carboxyl groups to primary alcohol groups and the latter to methyl groups. The hydrogenation may be effected at a temperature ranging from room temperature to 400° F. or more and at pressures ranging from atmospheric to 1000 pounds or more. Sufficient hydrogen must, of course, be used to satisfy the unsaturated compounds of the fraction being treated and, in general, an excess of hydrogen will generally be used in order to insure complete hydrogenation.

The process of the present invention may be effected in any suitable equipment, a particularly satisfactory system comprising a fixed bed process in which the catalyst is disposed in one or more reaction zones and the unsaturated fraction to be hydrogenated is passed therethrough either in upward or downward flow and either concurrently or countercurrently to a stream of hydrogen. Fluidized type process in which the catalyst is carried into the reaction zone by the unsaturated fraction and/or hydrogen and maintained in a state of turbulence in the reaction zone under hindered settling conditions, moving bed type process in which the reactants are passed concurrently or countercurrently to a moving bed of catalyst, or the suspensoid type operation in which the catalyst is carried as a slurry in the reactants, may in some cases be employed. As hereinbefore set forth, usually an excess of hydrogen is employed and provisions are, therefore, made for recovering the excess hydrogen and recycling it, all or in part, to the reaction zone. Conventional processes using guard reactors to remove impurities from the charging stock prior to the hydrogenation treatment may also be employed.

The following example is introduced to further illustrate the novelty and utility of the present invention but not with the intention of unduly limiting the same.

Two platinum on silica catalysts were prepared, one being prepared in the absence of a normally solid aromatic hydrocarbon and is designated catalyst A, and the other being prepared in accordance with the teachings of the present invention and is designated catalyst B.

Catalyst A was prepared as follows: 23.9 grams of partially dried silica spheres were impregnated with a solution of 2.24 grams of chloroplatinic acid (about 38% Pt content) in 48.5 cc. of $H_2O$. The mixture was heated to drive off excess water. When the material was dry enough to be transferred, it was put into a glass tube for reduction. The reduction with $H_2$ was carried out starting at room temperature and increasing the temperature to 572° F. over a period of five hours, followed by additional heating for about two hours at 572° F.

Catalyst B was prepared as follows: 95.8 grams of another portion of the partially dried silica spheres were treated with a solution of 26.2 grams of diphenyl in 170 cc. of benzene. After the impregnation had taken place, excess solution (94 cc.) was decanted and the sample was subjected to a vacuum while heated on a water bath. Following the removal of the benzene, the silica spheres containing the diphenyl were impregnated with a solution of 8.96 grams of chloroplatinic acid in 194 cc. of $H_2O$. The mixture was heated on a steam bath to remove excess moisture and then was transferred to a glass tube for reduction. The platinic chloride was reduced by heating in the presence of hydrogen at a temperature of 176° to 212° F. and then at a temperature of 572° F. for about 3 hours. During the reduction the diphenyl present on the catalyst was hydrogenated to dicyclohexyl and was removed with the hydrogen stream.

The above catalysts were tested for activity in the hydrogenation of benzene at an initial pressure of 100 atmospheres of hydrogen. The rate of hydrogenation was determined by observing the decrease in pressure. The hydrogenation was effected in an autoclave which was heated to 176° F. over the course of one hour and maintained at that temperature throughout the length of the test. No hydrogenation was effected with catalyst A until a temperature of about 160° F. was reached and the rate of hydrogenation thereafter was equivalent to a pressure decrease of 30 atmospheres during the first hour and about 12 atmospheres during the fourth hour.

On the other hand, with catalyst B, hydrogenation of benzene began at room temperature and by the time the autoclave was heated to 176° F. the pressure had dropped from 100 atmospheres to 40 atmospheres, and the pressure finally dropped to 10 atmospheres in the following 30 minutes.

It will be noted from these data that catalyst B is about 2½ times more active than catalyst A.

I claim as my invention:

1. A hydrogenation process which comprises subjecting a hydrogenatable unsaturated compound to contact at hydrogenating conditions with hydrogen and a catalyst prepared by treating an inorganic oxide carrier material with a solution of a normally solid aromatic hydrocarbon, and subsequently compositing therewith a metal from group VIII of the periodic table.

2. A hydrogenation process which comprises subjecting a hydrogenatable unsaturated compound to contact at hydrogenating conditions with hydrogen and a catalyst prepared by treating silica with a solution of a normally solid aromatic hydrocarbon, and subsequently compositing therewith a metal from group VIII of the periodic table.

3. A hydrogenation process which comprises subjecting a hydrogenatable unsaturated compound to contact at hydrogenating conditions with hydrogen and a catalyst prepared by treating silica with a solution of a normally solid aromatic hydrocarbon and subsequently compositing platinum therewith.

4. A hydrogenation process which comprises subjecting a hydrogenatable unsaturated compound to contact at hydrogenating conditions with hydrogen and a catalyst prepared by treating silica with a solution of a normally solid aromatic hydrocarbon and subsequently compositing palladium therewith.

5. A process for the hydrogenation of a hydrogenatable unsaturated hydrocarbon which comprises contacting said hydrocarbon at hydrogenating conditions with hydrogen and a catalyst prepared by treating silica with a solution of diphenyl and subsequently compositing platinum therewith.

6. A process for hydrogenating benzene which comprises subjecting benzene to contact at a temperature of from about atmospheric to about 400°

F. with hydrogen and a catalyst prepared by treating silica with a solution of a normally solid aromatic hydrocarbon and subsequently compositing platinum therewith.

VLADIMIR HAENSEL.

REFERENCES CITED

The following references are of record in the file of this patent:

UNITED STATES PATENTS

| Number | Name | Date |
| --- | --- | --- |
| 2,332,572 | Hepp et al. | Oct. 26, 1943 |
| 2,328,828 | Marschner | Sept. 7, 1943 |
| 2,456,633 | Haensel | Dec. 21, 1948 |

FOREIGN PATENTS

| Number | Country | Date |
| --- | --- | --- |
| 487,285 | Great Britain | June 17, 1938 |